US009275037B2

(12) United States Patent
Moore, Jr. et al.

(10) Patent No.: US 9,275,037 B2
(45) Date of Patent: Mar. 1, 2016

(54) MANAGING COMMENTS RELATING TO WORK ITEMS

(71) Applicant: International Business Machines Corporation, Armonk, NY (US)

(72) Inventors: John E. Moore, Jr., Brownsburg, IN (US); Humberto Orozco Cervantes, Tonala (MX); Selene M. Orozco Nuñez, Zapopan (MX); Gabriel Ruelas Arana, Zapopan (MX); Annita Tomko, Zapopan (MX)

(73) Assignee: International Business Machines Corporation, Armonk, NY (US)

( * ) Notice: Subject to any disclaimer, the term of this patent is extended or adjusted under 35 U.S.C. 154(b) by 90 days.

(21) Appl. No.: 14/182,350

(22) Filed: Feb. 18, 2014

(65) Prior Publication Data

US 2015/0234809 A1 Aug. 20, 2015

(51) Int. Cl.
*G06F 17/27* (2006.01)
(52) U.S. Cl.
CPC ........ *G06F 17/2735* (2013.01); *G06F 17/2775* (2013.01)
(58) Field of Classification Search
None
See application file for complete search history.

(56) References Cited

U.S. PATENT DOCUMENTS

| 6,327,586 B1 | 12/2001 | Kisiel |
| 6,698,013 B1 | 2/2004 | Bertero et al. |
| 2007/0239434 A1* | 10/2007 | Rubanovich et al. ............. 704/9 |
| 2008/0243737 A1* | 10/2008 | Rieman et al. .................. 706/18 |

FOREIGN PATENT DOCUMENTS

| EP | 1235163 A2 | 8/2002 |
| WO | 2009149453 A1 | 12/2009 |

OTHER PUBLICATIONS

"An innovative way for document and work item management in agile development process", Authors Disclosed Anonymously, IP.com Prior Art Database Technical Disclosure, IPCOM000227667D, May 10, 2013, <http://ip.com/IPCOM/000227667>.

"Method and System to Enable Specific Dictionaries based on Context Determination Rules", Authors Disclosed Anonymously, IP.com Prior Art Database Technical Disclosure, IPCOM000216741D, Apr. 16, 2012, <http://ip.com/IPCOM/000216741>.

Wikipedia, "Record linkage", last modified Nov. 11, 2013, printed Nov. 21, 2013, <http://en.wikipedia.org/wiki/Fuzzy_matching>.

* cited by examiner

*Primary Examiner* — Jeremiah Bryar
(74) *Attorney, Agent, or Firm* — William H. Hartwell; John W. Hayes

(57) ABSTRACT

A computer for managing textual content of phrases where the computer determines if a phrase is entered into a first field in a display, wherein the phrase contains textual content. The computer determines if a portion of the textual content of the phrase is present in a phrase dictionary, wherein the phrase dictionary contains textual content of one or more topics. Responsive to determining that the portion of the textual content of the phrase is not present in the phrase dictionary, the computer determines to not enter the portion of the textual content of the phrase in a second field of the display.

17 Claims, 4 Drawing Sheets

MANAGING COMMENTS RELATING TO WORK ITEMS

BACKGROUND

Typical Information Technology (I/T) environments practice documenting changes or troubleshooting ongoing issues which occur during everyday operations. Documentation of activities can be performed in various programs where a participating user can enter details of an activity in particular comment fields relating to the activity. There are instances where details of the activity entered by the participating user may not be useful to other participating users who can view the documentation containing the details of the activity. For example, details of an activity the participating user provides are not always relevant to another participating user's job responsibilities. Additionally, details of the documented activity can contain additional irrelevant information, which participating users viewing the documentation can misinterpret.

Typically, an administrative user approves of any documentation of activities prior to the documentation being available for other participating users to view. Since the activities can be in different fields of a business area, an administrative user for the specific area would have to approve the documentation of the activity provided by the user. In certain situations, the administrative user can encounter a large quantity of the documentation of activities, which creates a backlog delaying when another participating user can view the information.

SUMMARY

Embodiments of the present invention disclose a method, computer program product and computer system for managing textual content of phrases. A computer determines, by one or more processors, if a phrase is entered into a first field in a display, wherein the phrase contains textual content. The computer determines, by one or more processors, if a portion of the textual content of the phrase is present in a phrase dictionary, wherein the phrase dictionary contains textual content of one or more topics. Responsive to determining that the portion of the textual content of the phrase is not present in the phrase dictionary, the computer determines, by or more processors, to not enter the portion of the textual content of the phrase in a second field of the display.

DETAILED DESCRIPTION

Embodiments of the present invention manage textual content of a phrase that a participating user posts into a first field in a display. Embodiments of the present invention have the ability to determine if the phrase containing textual content is entered into the first field. Embodiments of the present invention have the ability to utilize a phrase dictionary containing words, abbreviations, and acronyms to determine if a portion of the textual content of the phrase is present in the phrase dictionary. If the portion of the textual content of the phrase is present in the phrase dictionary, embodiments of the present invention have the ability not to display the portion of the textual content of the phrase in a second field of the second display.

Figure 1:
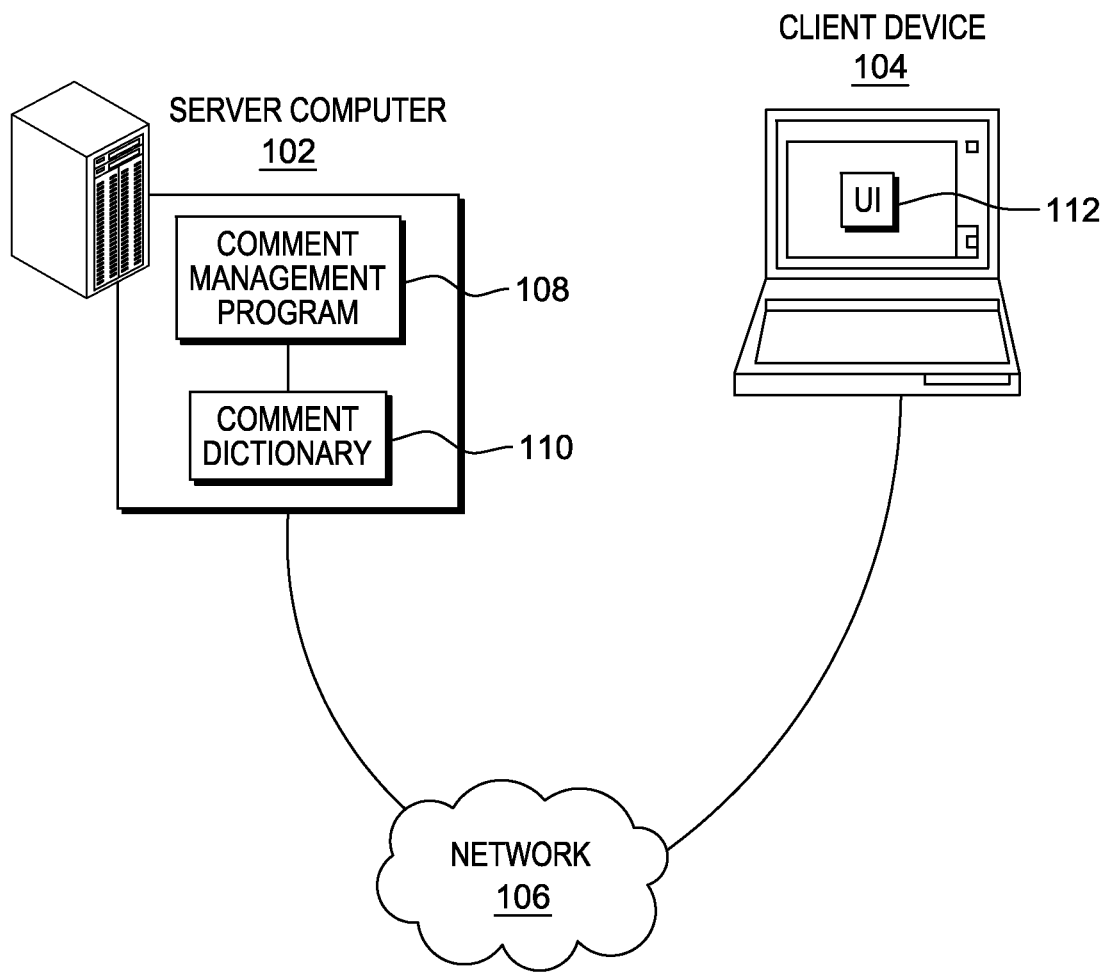
FIG. 1 is a functional block diagram illustrating a distributed data processing environment, in accordance with an embodiment of the present invention.

FIG. 1 is a functional block diagram illustrating a distributed data processing environment, in accordance with one embodiment of the present invention. The distributed data processing environment includes server computer 102 and client device 104 interconnected over network 106.

Server computer 102 may be a desktop computer, a laptop computer, a tablet computer, a specialized computer server, a smartphone, or any other computer system known in the art. In certain embodiments, server computer 102 represents a computer system utilizing clustered computers and components that act as a single pool of seamless resources when accessed through network 106, as is common in data centers and with cloud computing applications. In general, server computer 102 is representative of any programmable electronic device or combination of programmable electronic devices capable of executing machine-readable program instructions and communicating with other computer devices via a network. In this embodiment, server computer 102 has the ability to communicate with other computer devices to query the computer devices for information.

Comment management program 108 residing on server computer 102 has the ability to manage textual content, such as comments, posted in a specific field. In this embodiment, the specific field is located on a web page of a website where participating users are discussing a specific topic. Comment management program 108 utilizes comment dictionary 110 to determine whether a comment being entered into the specified field should not be displayed on the web page. Comment management program 110 can determine to remove the comment from the web page if deemed irrelevant to the subject matter or can limit the number of participating users who can view the comment depending on job responsibilities associated with the job title of each participating user.

In this embodiment, comment dictionary 110 residing on server computer 102 is capable of communicating with comment management program 108. In another embodiment, comment dictionary 110 can reside in comment management program 108. Comment dictionary 110 contains a list of words relating to a topic or a business area for which comment management program 108 manages comments. Comment dictionary 110 also contains user information, such as job title and associated job responsibilities, for each participating user providing comments.

In general, network 106 can be any combination of connections and protocols that will support communications between server computer 102 and client device 104. Network 106 can include, for example, a local area network (LAN), a wide area network (WAN) such as the internet, a cellular network, or any combination of the preceding, and can further include wired, wireless, and/or fiber optic connections.

In one embodiment, comment management program 108 may be a web service accessible via network 106 to a user of a separate device, e.g., client device 104. In another embodiment, comment management program 108 may be operated directly by a user of server computer 102.

User interface (UI) 112 on client device 104 displays information that any one of the processes of comment management program 108 may display to a user. User interface 112 can be, for example, a graphical user interface (GUI) or a web user interface (WUI) and can display text, documents, web browser windows, user options, application interfaces and instructions for operation. In various embodiments of the present invention, client device 104 can be a laptop computer, a tablet computer, a netbook computer, a personal computer (PC), a desktop computer, a personal digital assistant (PDA), a smartphone, or any programmable electronic device capable of communicating with server computer 102 via network 106.

Figure 2:
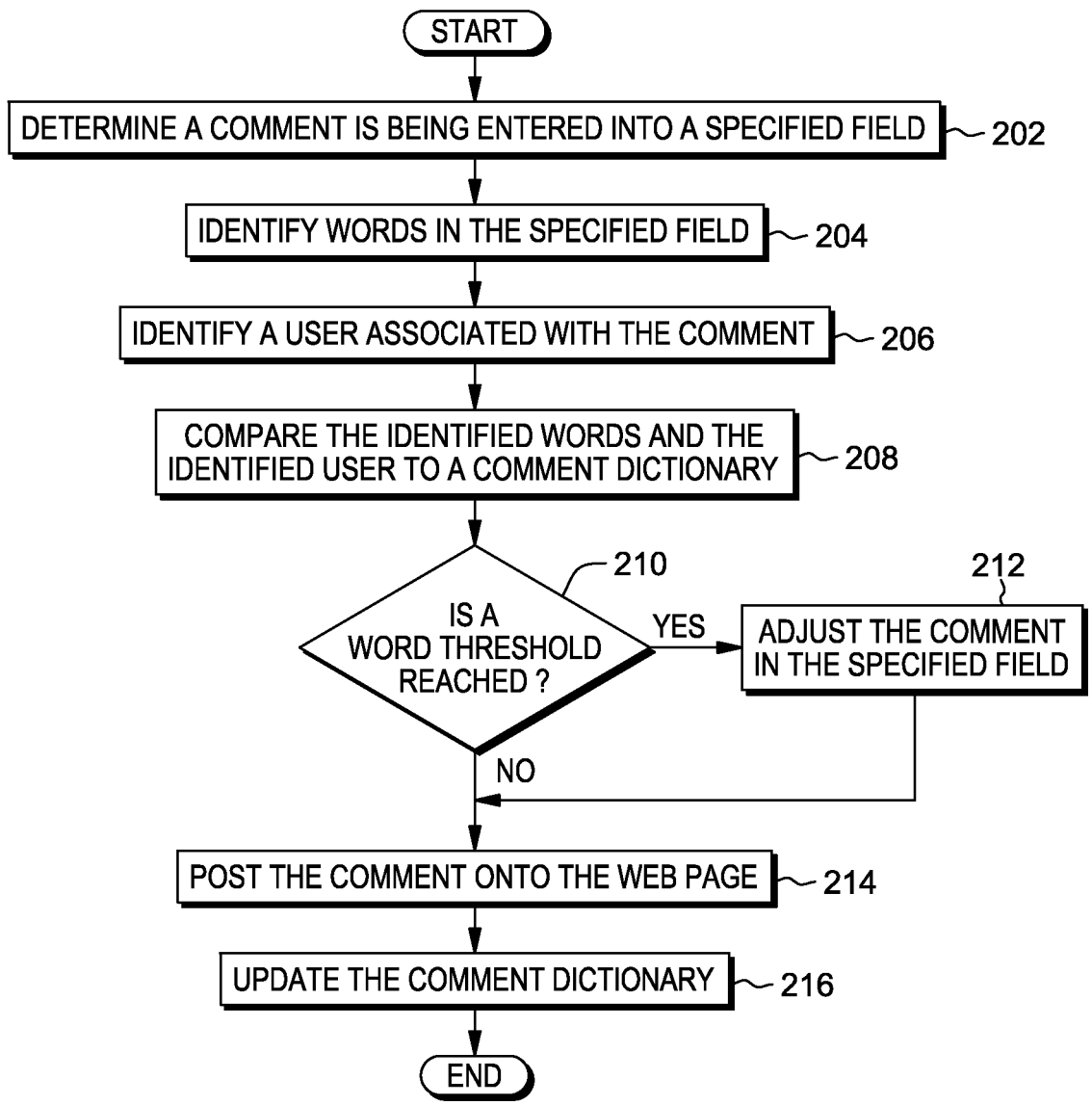
FIG. 2 is a flowchart depicting operational steps of a comment management program for managing comments on a web page, in accordance with an embodiment of the present invention.

FIG. 2 is a flowchart depicting operational steps of comment management program 108 for managing comments on a web page, in accordance with an embodiment of the present invention.

Comment management program 108 determines a comment is being entered into a specified field (step 202). For discussion purposes, a comment is one embodiment of a phrase, where the phrase contains textual content. The specified field is any section of a display, such as a web page, where a user participating in a discussion on the web page can enter text (i.e., comment) into the specified field. For discussion purposes, a first field of a display is the specified field of the web page and a second field of the display is the web page. In this embodiment, comment management program 108 determines a comment is being entered when the participating user activates the specified field through a user input, such as a text cursor. Comment management program 108 determines the participating user has selected the specified field with the text cursor, and a subsequent comment is going to be entered by the participating user. In another embodiment, comment management program 108 determines a comment is being entered when new text appears in a specified field of a web page.

Comment management program 108 identifies words in the specified field (step 204). In this embodiment, comment management program 108 identifies each word as the participating user enters the comment in the specified field. Comment management program 108 can identify complete words, abbreviations, and acronyms. For example, comment management program 108 can identify an acronym such as "I/T", and can associate the acronym with "Information Technology". Similarly, comment management program 108 can identify an abbreviation such as "server comp", and can associate the abbreviation with "server computer". Comment management program 108 can utilize a pre-defined dictionary (i.e., comment dictionary 110) particular to the discussion on the web page to identify complete words, abbreviations, and acronyms. For example, comment management program 108 can utilize a web page specific dictionary for a web page of a forum-based website discussing server accessibility for server model A. Comment management program 108 can utilize another web page specific dictionary for another web page of the forum-based website discussing server accessibility for server model B. This is due in part to server model A having unique abbreviations and acronyms compared to server model B.

Comment management program 108 can also utilize the particular dictionary to provide spelling suggestions if a participating user on the web page misspells a complete word, abbreviation, or acronym. For each complete word, abbreviation, and acronym, comment management dictionary 108 can have a list of variations deemed as commonly misspelled for each of these complete words, abbreviations, and acronyms. In one embodiment, as the participating user enters the comment, comment management program 108 prompts a message on the user interface (i.e., user interface 112) identifying a misspelled word and providing a suggestion as to what the intended word might be.

Comment management program 108 identifies a user associated with the comment (step 206). In one embodiment, comment management program 108 identifies the participating user entering the comment into the specified field based on a username of the participating user. Comment management program 108 maintains a directory containing usernames of each participating user and additionally, the directory contains the job title for each participating user. The job title is associated with job responsibilities which correlate to an amount and type of information the participating user can post. For example, a particular user who engineered server A may not have as much knowledge of server B. In this embodiment, comment dictionary 110 contains the directory of the participating users. Similar to comment management program 108 utilizing a particular dictionary for a particular web page, comment management program 108 can utilizes a different directory of participating users for a particular web page.

Comment management program 108 compares the identified words and the identified user to comment dictionary 110 (step 208). In this embodiment, comment management program 108 compares the identified words from step 204 to comment dictionary 110, containing textual content of one or more topics, such as words, abbreviations, and acronyms with respect to content being discussed on a particular web page of a website. For discussion purposes, textual content of one or more topics is referred to as topic-relevant textual content. An administrative user of comment management program 108 utilizes user interface 112 to pre-define topic-relevant words, abbreviations, and acronyms for comment dictionary 110. In comparing the identified words with comment dictionary 110, comment management program 108 determines a number of words from the identified words of step 204 that are present in comment dictionary 110. Comment management program 108 can utilize approximate string matching (i.e. fuzzy search feature) to determine which of the identified words, abbreviations, or acronyms are present in comment dictionary 110.

Comment dictionary 110 also contains a list of users of the web site along with job titles and associated job responsibilities. Comment dictionary 110 is configured to associate a particular set of topic-relevant words, abbreviations, and acronyms with a particular associated job responsibility. For example, if person A has a job title such as "software programmer", person A might have a particular set of words, abbreviations, and acronyms from comment dictionary 110 relevant to the job title. Comment management program 108 determines elements of that particular set of words, abbreviations, and acronyms are allowed by person A to be entered as a comment into the specified field. Comment management program 108 compares the number of words to the particular set of topic relevant words, abbreviations, and acronyms associated with the job responsibilities of the participating user.

In another embodiment, comment management program 108 compares the identified words from step 204 to a pre-defined dictionary, containing common irrelevant words, abbreviations, and acronyms with respect to content being discussed on the web page. Comment management program 108 can flag any commonly irrelevant words, abbreviations, and acronyms which appear in the identified words of step 204.

Comment management program 108 determines if a word threshold is reached (decision step 210). In this embodiment, the word threshold is a total number of topic-irrelevant words, abbreviations, and acronyms in the specified field. Comment management program 108 determines if the words, abbreviations, and acronyms in the comment are present in comment dictionary 110. In the instance the word threshold is not reached ("no" branch, step 210), comment management program 108 determines to post the comment onto the web page (step 214). In the instance the word threshold is reached ("yes" branch, step 210), comment management program 108 determines to adjust the comment entered into the specified field (step 212). Comment management program 108 also has the ability to determine if the word threshold is reached and exceeded based on the identified job responsibilities of the participating user. If the participating user has a particular job title, comment management program 108 can determine the word threshold is reached ("yes" branch, step 210), regardless of the number of topic-irrelevant words, abbreviations, and acronyms in the specified field.

In another embodiment, not illustrated in FIG. 2, the word threshold is a number of relevant words, abbreviations, and acronyms. In the instance the word threshold for the number of relevant words is not reached, comment management program 108 determines to adjust the comment entered into the specified field. In the instance the word threshold for the number of relevant words, abbreviations, and acronyms is reached, comment management program 108 determines to post the comment into the specified field.

Comment management program 108 adjusts the comment entered into the specified field (step 212). In this embodiment, comment management program 108 flags the portion of the comment which did reach the word threshold. Comment management program 108 deems the flagged portion of the comment as irrelevant to the discussion on the web page. Comment management program 108 determines to not enter the portion of the comment on the web page.

Comment management program 108 posts the comment onto the web page (step 214). In this embodiment, comment management program 108 posts the portions of the comment by entering the portions of the comment which have reached the threshold for the number of topic-relevant words in a specified field on the web page. Any portion of the comment that comment management program 108 flags has limited viewability to users. In this embodiment, the viewability is limited to the portion that user comment management program identifies as associated with the comment, along with an administrative user of comment management program 108. In another embodiment, the ability to view a comment correlates to the job title and job responsibility of the viewing participating user. For example, if the participating user viewing the web page specializes in "server system management" and there are comments on the web page relating to "software programming", then comment management program 108 can remove from view the comments relating to "software programming".

Comment management program 108 updates the dictionary (step 216). In this embodiment, comment management program 108 can identify one or more sentences where the word threshold was reached ("yes" branch, step 210) and determine if any additional words from the sentence are to be added to comment dictionary 110. Comment management program 108 can determine if any topic-relevant words, abbreviations, and acronyms are present in the sentence but not in the comment dictionary 110, and query the administrative user through user interface 112 to determine whether or not to add the topic relevant words, abbreviations, and acronyms present in the sentence to comment dictionary 110. Upon comment management program 108 receiving a selection of topic relevant words, abbreviations, and acronyms to add, comment management program 108 updates the dictionary by storing the selection. Since comment management program 108 can utilize a particular dictionary for each web page of a website, comment management program 108 can update each of the particular dictionaries accordingly.

Figure 3:
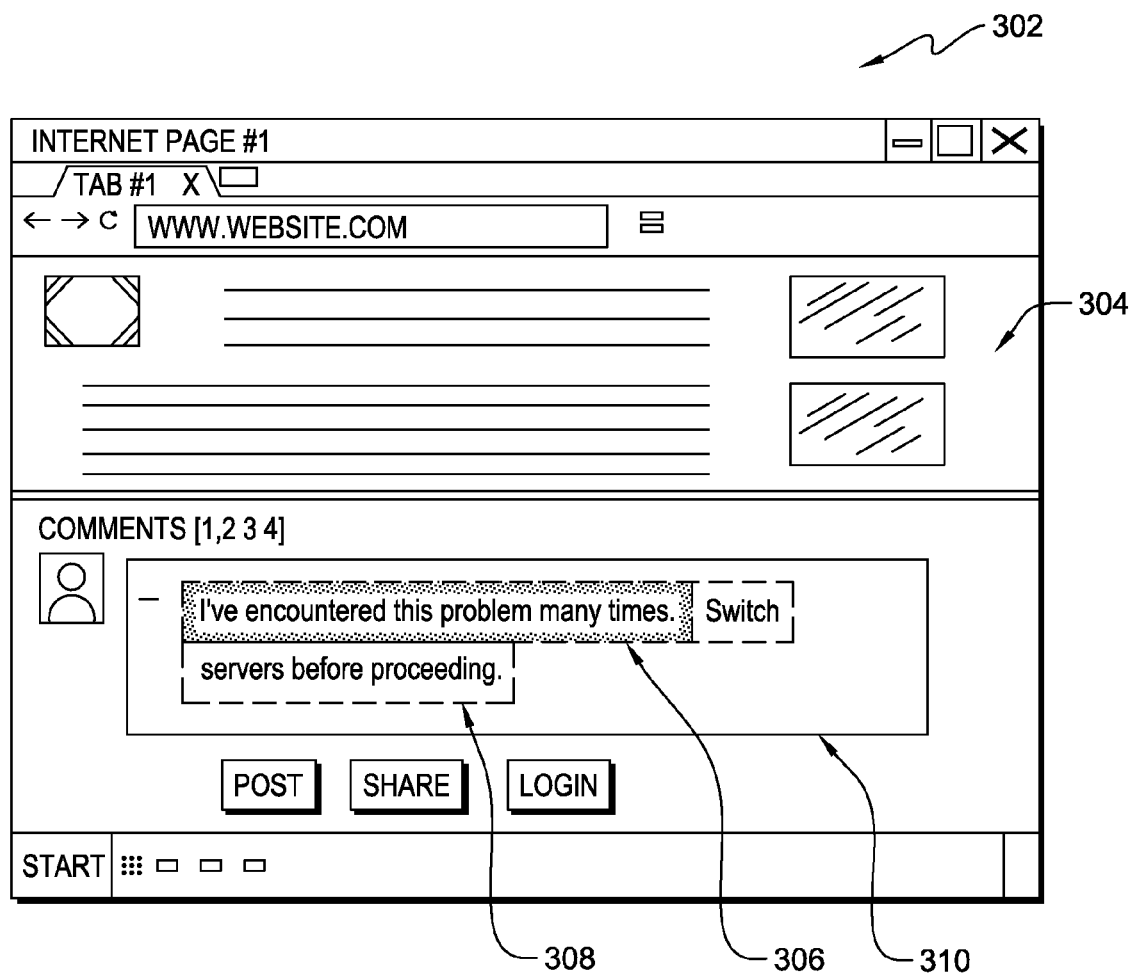
FIG. 3 illustrates a scenario for which a comment management program manages a comment being posted to a web page, in accordance with an embodiment of the present invention.

FIG. 3 illustrates a scenario for which comment management program 108 manages a comment being posted to a web page, in accordance with an embodiment of the present invention.

In this embodiment, web browser 302 is displaying web page 304, where web page 304 is a forum website where participating users can post answers to issues other participating users are encountering. The forum website contains a discussion pertaining to servers and comment dictionary 110 contains words, abbreviations, and acronyms relevant to the topic being discussed (i.e., servers). Comment management program 108 determines a comment is being entered into specified field 310. Comment management program 108 determines to flag highlighted sentence 306 since the word threshold is not reached for this particular sentence. In this embodiment, the highlighted sentence 306 can still be visible to the user posting the comment and any administrator user of web page 304 once the comment is posted to web page 304. However, any other participating user of web page is not able to see the highlighted sentence 306. In another embodiment, comment management program 108 can prompt a secondary window notifying the posting user that highlighted sentence 306 has not reached the word threshold and requesting that highlighted sentence 306 be adjusted or edited by the posting user so that it can reach the word threshold.

Comment management program 108 determines to post sentence 308 since the word threshold is reached for this particular sentence. In this example, sentence 308 contains words "switch" and "servers" which are present in comment dictionary 110. Sentence 308 is viewable by the posting user, participating users of web page 304, and the administrative user since the word threshold has been met. Comment management program 108 can provide any additional words identified in sentence 308, not in comment dictionary 110, as possible words to add to the comment dictionary. Through user interface 112, the administrative user can specify which words, if any, to add to comment dictionary 110 for future use.

Figure 4:
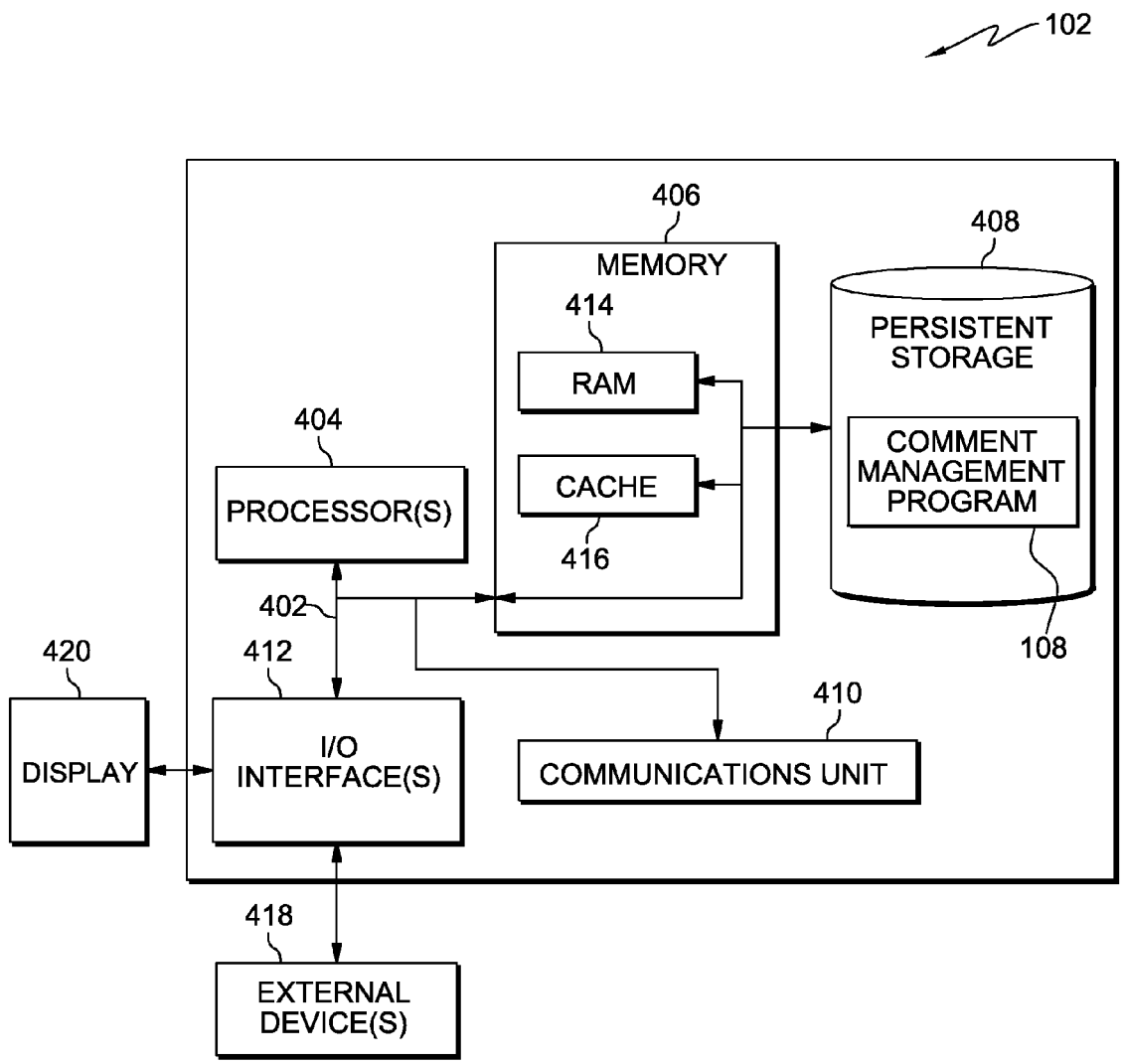
FIG. 4 is a block diagram of components of a computer system, such as the computer server of FIG. 1, in accordance with an embodiment of the present invention.

FIG. 4 depicts a block diagram of components of a computer, such as server computer 102, operating comment management program 108 within the distributed data processing environment, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 102 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage medium.

Comment management program 108 stored in persistent storage 408 for execution by one or more of computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage medium that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including systems and devices within or controlled by server computer 102. In these examples, communications unit 410 includes one or more wireless network interface cards. Communications unit 410 may provide communications through the use of either or both physical and wireless communications links. Computer programs and processes, such as comment management program 108, may be downloaded to persistent storage 408 through communications unit 410, or uploaded to another system through communications unit 410.

I/O interface(s) 412 allows for input and output of data with other devices that may be connected to server computer 102. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 408 via I/O interface(s) 412. I/O interface(s) 412 may also connect to a display 420.

Display 420 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function (s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for managing textual content of phrases, the method comprising the steps of:
   determining, by one or more processors, if a phrase is entered into a first field in a display, wherein the phrase contains textual content;
   determining, by one or more processors, a user name associated with the phrase entered into the first field of the display;
   querying, by one or more processors, a directory for information associated with the determined user name, wherein the information includes at least a list of titles and associated responsibilities of the determined user name;
   determining, by one or more processors, if a portion of the textual content of the phrase is present in a phrase dictionary, wherein the phrase dictionary contains textual content of one or more topics; and
   responsive to determining that the portion of the textual content of the phrase is not present in the phrase dictionary, determining, by or more processors, to not enter the portion of the textual content of the phrase in a second field of the display.

2. The method of claim 1, further comprising the step of:
   removing, by one or more processors, the portion of the textual content of the phrase from the first field of the display.

3. The method of claim 1, wherein the responding step further includes determining, by one or more processors, if the portion of the textual content of the phrase present in the phrase dictionary does not exceed a threshold, wherein the threshold is a total number of words.

4. The method of claim 1, further comprising the step of:
   responsive to determining, another portion of the textual content of the phrase present in the phrase dictionary does exceed a threshold, wherein the threshold is a total number of words, entering, by one or more processors, the other portion of the textual content of the phrase in the second field of the display.

5. The method of claim 4, further comprising the step of:
   displaying, by one or more processors, the other portion of the textual content of the phrase in the second field of the display.

6. The method of claim 1, wherein the phrase dictionary containing textual content of one or more topics includes at least one of: a word, an abbreviation, or an acronym.

7. A computer program product for managing textual content of phrases, the computer program product comprising:
   one or more computer readable tangible storage media and program instructions stored on at least one of the one or more storage media, wherein the one or more computer-readable storage media is not a signal per se, the program instructions comprising:
   program instructions to determine if a phrase is entered into a first field in a display, wherein the phrase contains textual content;
   program instructions to determine a user name associated with the phrase entered into the first field of the display;
   program instructions to query a directory for information associated with the determined user name, wherein the information includes at least a list of titles and associated responsibilities of the determined user name;
   program instructions to determine if a portion of the textual content of the phrase is present in a phrase dictionary, wherein the phrase dictionary contains textual content of one or more topics; and
   program instructions to, responsive to determining that the portion of the textual content of the phrase is not present in the phrase dictionary, determine to not enter the portion of the textual content of the phrase in a second field of the display.

8. The computer program product of claim 7, further comprising program instructions, stored on the one or more computer readable storage media, which when executed by a processor, cause the processor to:
   remove the portion of the textual content of the phrase from the first field of the display.

9. The computer program product of claim 7, wherein the responding step further includes program instructions, stored on the one or more computer readable storage media, which when executed by a processor, cause the processor to determine if the portion of the textual content of the phrase present in the phrase dictionary does not exceed a threshold, wherein the threshold is a total number of words.

10. The computer program product of claim 7, further comprising program instructions, stored on the one or more computer readable storage media, which when executed by a processor, cause the processor to:

responsive to determining another portion of the textual content of the phrase present in the phrase dictionary does exceed a threshold, wherein the threshold is a total number of words, enter the other portion of the textual content of the phrase in the second field of the display.

11. The computer program product of claim 10, further comprising program instructions, stored on the one or more computer readable storage media, which when executed by a processor, cause the processor to:

display the other portion of the textual content of the phrase in the second field of the display.

12. The computer program product of claim 7, wherein the phrase dictionary containing textual content to one or more topics includes at least one of: a word, an abbreviation, or an acronym.

13. A computer system managing textual content of phrases, the computer system comprising:

one or more computer processors;

one or more computer readable storage media;

program instructions stored on the one or more computer readable storage media, for execution by at least one of the one or more computer processors, the program instructions comprising:

program instructions to determine if a phrase is entered into a first field in a display, wherein the phrase contains textual content;

program instructions to determine a user name associated with the phrase entered into the first field of the display;

program instructions to query a directory for information associated with the determined user name, wherein the information includes at least a list of titles and associated responsibilities of the determined user name;

program instructions to determine if a portion of the textual content of the phrase is present in a phrase dictionary, wherein the phrase dictionary contains textual content of one or more topics; and program instructions to, responsive to determining that the portion of the textual content of the phrase is not present in the phrase dictionary, determine to not enter the portion of the textual content of the phrase in a second field of the display.

14. The computer system of claim 13, further comprising program instructions, stored on the one or more computer readable storage media, which when executed by a processor, cause the processor to:

remove the portion of the textual content of the phrase from the first field of the display.

15. The computer system of claim 13, wherein the responding step further includes program instructions, stored on the one or more computer readable storage media, which when executed by a processor, cause the processor to determine if the portion of the textual content of the phrase present in the phrase dictionary does not exceed a threshold, wherein the threshold is a total number of words.

16. The computer system of claim 13, further comprising program instructions, stored on the one or more computer readable storage media, which when executed by a processor, cause the processor to:

responsive to determining another portion of the textual content of the phrase present in the phrase dictionary does exceed a threshold, wherein the threshold is a total number of words, enter the other portion of the textual content of the phrase in the second field of the display.

17. The computer system of claim 16, further comprising program instructions, stored on the one or more computer readable storage media, which when executed by a processor, cause the processor to:

display the other portion of the textual content of the phrase in the second field of the display.

* * * * *